US009181851B1

(12) United States Patent
Bandyopadhyay et al.

(10) Patent No.: US 9,181,851 B1
(45) Date of Patent: Nov. 10, 2015

(54) ENGINE SYSTEM HAVING RADIAL FUEL INJECTION

(71) Applicant: Electro-Motive Diesel, Inc., LaGrange, IL (US)

(72) Inventors: Deep Bandyopadhyay, Naperville, IL (US); Michael B. Goetzke, Orland Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/278,206

(22) Filed: May 15, 2014

(51) Int. Cl.
*F02B 7/00* (2006.01)
*F02B 7/06* (2006.01)
*F02B 25/04* (2006.01)
*F02D 19/06* (2006.01)

(52) U.S. Cl.
CPC ... *F02B 7/06* (2013.01); *F02B 7/00* (2013.01); *F02B 25/04* (2013.01); *F02D 19/0684* (2013.01)

(58) Field of Classification Search
CPC ........ F02B 7/00; F02B 25/04; F02D 19/0684; F02D 19/0689–19/0694
USPC .......................................................... 123/41.72
See application file for complete search history.

(56) References Cited

U.S. PATENT DOCUMENTS

| 2,767,691 | A | | 10/1958 | Mengelkamp et al. |
|---|---|---|---|---|
| 3,407,790 | A | | 10/1968 | Antonsen et al. |
| 3,960,119 | A | * | 6/1976 | Dimitracopoulos .......... 123/268 |
| 4,527,516 | A | | 7/1985 | Foster |
| 5,035,206 | A | | 7/1991 | Welch et al. |
| 5,293,846 | A | | 3/1994 | Takahashi |
| 5,806,473 | A | * | 9/1998 | Kometani et al. ........... 123/73 C |
| 5,934,245 | A | | 8/1999 | Miller et al. |
| 6,883,468 | B2 | | 4/2005 | Lehman |
| 2006/0260585 | A1 | * | 11/2006 | Munshi et al. ................ 123/299 |

* cited by examiner

*Primary Examiner* — Lindsay Low
*Assistant Examiner* — Kevin Lathers
(74) *Attorney, Agent, or Firm* — Finnegan, Henderson, Farabow, Garrett & Dunner, LLP

(57) ABSTRACT

An engine system is disclosed. The engine system may have an engine block at least partially defining a cylinder bore, and a cylinder liner disposed within the cylinder bore. The engine system may also include a fuel injector configured to pass radially through the cylinder bore and threadingly engage the cylinder liner.

9 Claims, 1 Drawing Sheet

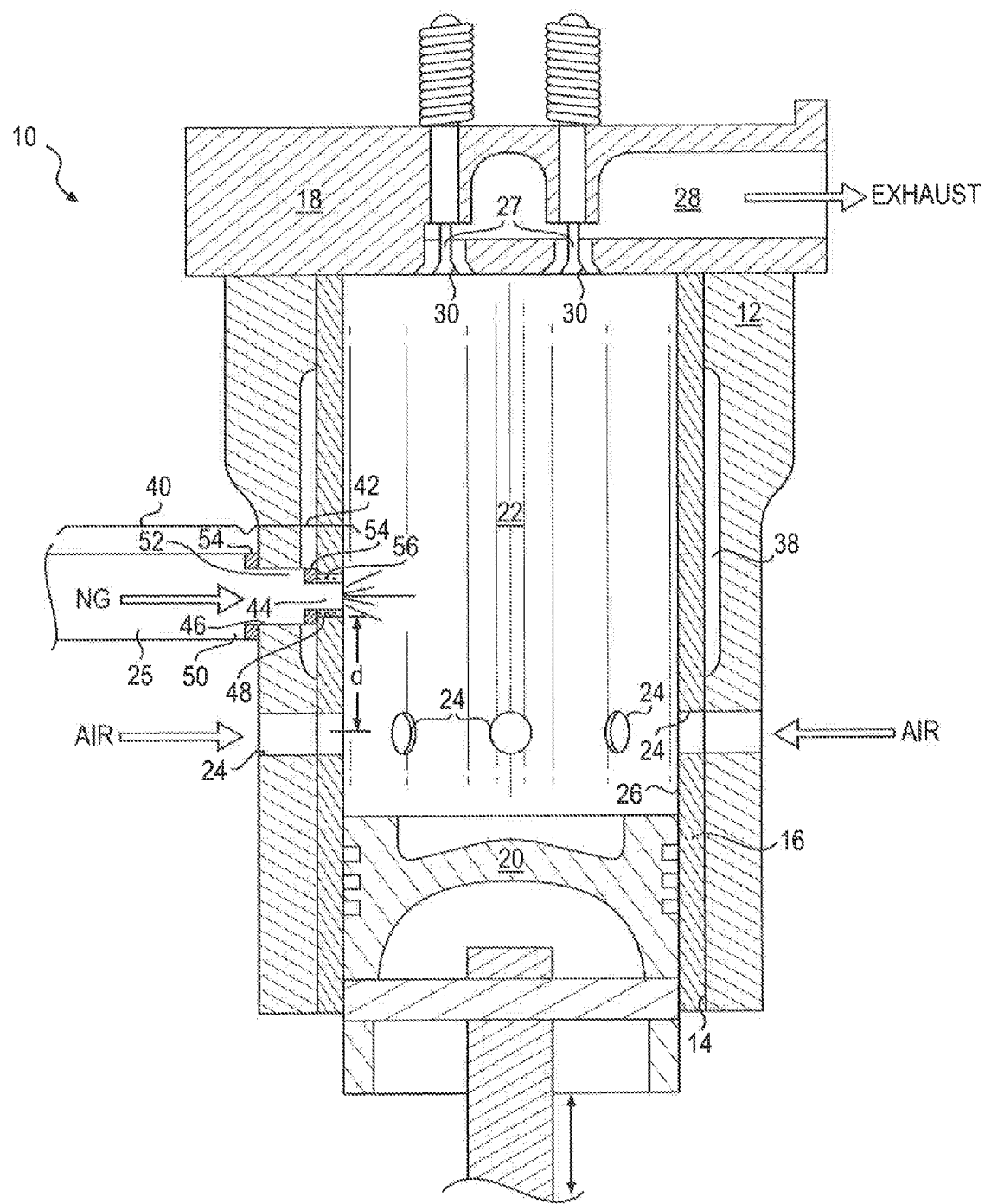

ENGINE SYSTEM HAVING RADIAL FUEL INJECTION

TECHNICAL FIELD

The present disclosure relates generally to an engine system and, more particularly, to an engine system having radial fuel injection.

BACKGROUND

Gaseous fuel-powered engines are common in locomotive applications. For example, the engine of a locomotive can be powered by natural gas (or another gaseous fuel) alone or by a mixture of natural gas and diesel fuel. Natural gas may be more abundant and, therefore, less expensive than diesel fuel. In addition, natural gas may burn cleaner in some applications.

Natural gas has traditionally been introduced radially into an engine's cylinders, to mix with air therein as an associated piston moves toward a top-dead-center (TDC) position. In some applications, a natural gas nozzle is situated to inject gaseous fuel through an existing air inlet port located within an annular surface of the engine's cylinder liner. Although somewhat effective, injecting gaseous fuel at this location can also be inefficient. In particular, some of the injected gaseous fuel may pass back out through the same air inlet port (or back out through another air inlet port) into an associated air box. In addition, injecting at this location results in advanced injection timing that can allow some of the injected fuel to exit the cylinder via still open exhaust valves. In either situation, some of the gaseous fuel is being wasted.

An exemplary dual-fuel natural gas/diesel engine is disclosed in U.S. Pat. No. 5,035,206 of Welch et al. that issued on Jul. 30, 1991 ("the '206 patent"). The engine includes a cylinder, a piston in the cylinder, and inlet ports around the cylinder that are uncovered by downward movement of the piston. A blower forces air through the inlet ports, and an injector is provided for injecting natural gas into the cylinder once during each cycle. The injector has a delivery conduit that opens into the cylinder at a location above the air inlet ports. When the piston is descending, the piston completely uncovers the delivery conduit before beginning to uncover the air inlet ports. In this configuration, the natural gas is timed for injection as late as possible, preferably after the piston reaches bottom-dead-center (BDC), and continues until after air entry has been stopped by upward movement of the piston. This provision ensures that a large portion of air will have filled the cylinder before the entry of natural gas, so as to minimize the escape and loss of natural gas.

Although the engine of the '206 patent may help to reduce the loss of natural gas, it may only be applicable to air-cooled engines and/or newly manufactured engines. In particular, the delivery conduit of the '206 patent may not be compatible with a liquid-cooled engine having a water jacket formed around the cylinder. Further, the '206 patent provides no way to retrofit an existing engine with the delivery conduit. In addition, injecting gaseous fuel during air introduction may still lead to reverse flow of the gaseous fuel out of the inlet ports.

The engine system of the present disclosure solves one or more of the problems set forth above and/or other problems in the art.

SUMMARY

In one aspect, the present disclosure is directed to an engine system. The engine system may include an engine block at least partially defining a cylinder bore, and a cylinder liner disposed within the cylinder bore. The engine system may also include a fuel injector configured to pass radially through the cylinder bore and threadingly engage the cylinder liner.

In another aspect, the present disclosure is directed to another engine system. This engine system may include an engine block at least partially defining a cylinder bore, a cylinder liner disposed within the cylinder bore, and a water jacket located between the cylinder bore and the cylinder liner. The engine system may also include a cylinder head configured to close off an end of the cylinder bore, at least one intake air port formed within the cylinder liner, and a piston reciprocatingly disposed within the cylinder liner. The engine system may also include a fuel injector configured to pass radially through the water jacket and the cylinder bore to threadingly engage the cylinder liner at an axial location between the at least one intake air port and the cylinder head. The fuel injector is configured to begin injecting fuel when the at least one intake air port is closed off by the piston at about 100° before the piston reaches top-dead-center, and to stop injecting fuel when the piston covers up a tip of the fuel injector at about 120° before the piston reaches top-dead-center.

In another aspect, the present disclosure is directed to a method of retrofitting an engine with a fuel injector. The method may include radially drilling a first bore through an engine block into a cylinder bore, and radially drilling a second bore through a cylinder liner. The method may also include tapping the second bore, and threadingly engaging the fuel injector with the second bore.

BRIEF DESCRIPTION OF THE DRAWING

FIG. 1 is a cross-sectional illustration of an exemplary disclosed engine system.

DETAILED DESCRIPTION

FIG. 1 illustrates a portion of an exemplary internal combustion engine 10. Although engine 10 is shown and described as a two-stroke gaseous fueled engine, it is contemplated that engine 10 may be another type of engine (e.g., a four-stroke gaseous fueled-engine or a two- or four-stroke dual fuel engine). Engine 10 may include, among other things, an engine block 12 defining at least one cylinder bore 14. A cylinder liner 16 may be disposed within cylinder bore 14, and a cylinder head 18 may be connected to engine block 12 to close off an end of cylinder bore 14. A piston 20 may be slidably disposed within cylinder liner 16, and piston 20 together with cylinder liner 16 and cylinder head 18 may define a combustion chamber 22. It is contemplated that engine 10 may include any number of combustion chambers 22 and that combustion chambers 22 may be disposed in an "in-line" configuration, in a "V" configuration, in an opposing-piston configuration, or in any other suitable configuration.

Piston 20 may be configured to reciprocate within cylinder liner 16 between TDC and BDC. In particular, piston 20 may be pivotally connected to a crankshaft (not shown), which is rotatably disposed within engine block 12. In this configuration, a sliding motion of each piston 20 within cylinder liner 16 may result in a rotation of the crankshaft. Similarly, a rotation of the crankshaft may result in a sliding motion of piston 20. As the crankshaft rotates through about 180°, piston 20 may move through two full strokes (i.e., from TDC to BDC to TDC). Engine 10 (as a two-stroke engine) may undergo a complete combustion cycle within this time that includes a power/exhaust/intake stroke (TDC to BDC) and an intake/compression stroke (BDC to TDC).

During a final phase of the intake stroke, air may be drawn and/or forced into combustion chamber 22 via one or more intake ports 24 located within an annular surface 26 of cylinder liner 16. In particular, as piston 20 moves downward within cylinder liner 16, a position will eventually be reached at which intake ports 24 are no longer blocked by piston 20 and instead are fluidly communicated with combustion chamber 22. When intake ports 24 are in fluid communication with combustion chamber 22 and a pressure of air at intake ports 24 is greater than a pressure within combustion chamber 22, air will pass through intake ports 24 into combustion chamber 22.

Gaseous fuel (e.g., natural gas) may be mixed with the air before, during, and/or after the air enters combustion chamber 22. In the disclosed embodiment, a single radial fuel injector 25 is located an axial distance d above intake ports 24 (i.e., between intake ports 24 and cylinder head 18). It is contemplated however, that any number of injectors 25 may be utilized. The distance d may be selected to provide a desired injection timing relative to the opening and/or closing of intake ports 24 during the movement of piston 20. In the disclosed embodiment, the distance d may be about 25-40 mm and injector 25 may be timed to inject fuel at about 100-120° before piston 20 reaches its TDC position. And for a cylinder having an internal diameter of about 200-250 mm, a ratio of the axial distance d to relative to the diameter may be about 1:5-10. As will be explained in more detail below, this unique ratio may provide for desired conditions (e.g., injection timings, pressures, temperatures, etc.) within combustion chamber 22 that promote efficiency and low emissions. The gaseous fuel from injector 25 may mix with the air from intake ports 24 to form a fuel/air mixture within combustion chamber 22.

During the beginning of the compression stroke described above, air may still be entering combustion chamber 22 via intake ports 24 as piston 20 starts its upward stroke to mix any residual gas with air and fuel in combustion chamber 22. Eventually, intake ports 24 may be blocked by piston 20, and further upward motion of piston 20 may compress the mixture. As the mixture within combustion chamber 22 is compressed, the mixture will increase in pressure and temperature until it combusts and releases chemical energy. This may result in a further and significant increase in the pressure and temperature within combustion chamber 22. It should be noted that, in a dual-fuel engine, an injection of liquid fuel (e.g., of diesel fuel) may be necessary to cause the mixture within combustion chamber 22 to ignite.

After piston 20 reaches TDC, the increased pressure caused by combustion may force piston 20 downward, thereby imparting mechanical power to the crankshaft. During an end portion of this movement, one or more exhaust valves 27 located within cylinder head 18 may open to allow pressurized exhaust within combustion chamber 22 to exit into an associated exhaust manifold 28 via a corresponding exhaust port 30. In particular, as piston 20 moves upward within cylinder liner 16, a position will eventually be reached at which exhaust valves 27 move to fluidly communicate combustion chamber 22 with exhaust ports 30. When combustion chamber 22 is in fluid communication with exhaust ports 30 and a pressure in combustion chamber 22 is greater than a pressure at exhaust ports 30, exhaust will pass from combustion chamber 22 through exhaust ports 30 into exhaust manifold 28. In the disclosed embodiment, movement of exhaust valve(s) 27 may be cyclically controlled, for example by way of a cam (not shown) or other device that is mechanically connected to the crankshaft. It is contemplated, however, that movement of exhaust valve(s) 27 may alternatively be controlled in a non-cyclical manner, if desired. It is also contemplated that exhaust port(s) 30 could alternatively be located within cylinder liner 18, with their openings and closings dictated by the motion of piston 20 (i.e., exhaust valves 27 could be omitted), such as in a loop-scavenged two-stroke engine. Although operation of a two-stroke engine 10 has been described with reference to FIG. 1, one skilled in the art would understand that fuel may be combusted and exhaust may be generated in a similar manner in a four-stroke engine.

Heat from the combustion process described above that could damage engine 10, if unaccounted for, may be dissipated from cylinder bore 14 by way of a water jacket 38. Water jacket 38 may be located between an internal wall of cylinder bore 14 and an external wall of cylinder liner 16. For example, water jacket 38 may be formed by a recess within engine block 12 at the internal wall of cylinder bore 14 and/or within the external wall of cylinder liner 16. It is also contemplated that water jacket 38 may be formed completely within engine block 12 around cylinder liner 16, formed completely within cylinder liner 16, and/or formed by a hollow sleeve (not shown) that is brazed to either one of engine block 12 or cylinder liner 16, as desired. Water, glycol, or a blended mixture may be directed through water jacket 38 to absorb heat from engine block 12 and cylinder liner 16.

Gaseous fuel injector 25 may pass through water jacket 38. Specifically, gaseous fuel injector 25 may include a base 40, and a nozzle 42 having a tip 44; and engine block 12 and cylinder liner 16 may include bores 46 and 48 that are configured to receive nozzle 42 and tip 44, respectively. Bore 46 may be larger than bore 48, such that external access to bore 48 may be provided by way of bore 46. A first shoulder 50 may be located at a base of nozzle 42, and a second shoulder 52 may be located at a base of tip 44. Shoulder 50 may be configured to abut a face machined into engine block 12 (or a different external surface of water jacket 38), while shoulder 52 may be configured to abut a face machined into an external wall of cylinder liner 16 (or a different internal surface of water jacket 38). A seal (e.g, an elastomeric o-ring) 54 may be located at each of these abutments. Tip 44 may include threads 56 that engage cylinder liner 16, such that as injector 25 is rotated, first and second shoulders 50, 52 may be drawn inward to compress seals 54 against the faces of engine block 12 and cylinder liner 16. In this configuration, seals 54 may inhibit coolant from leaking out of water jacket 38 and into combustion chamber 22 (e.g., via bore 48) or into a crankcase (not shown) connected below engine block 12 (e.g., via bore 46).

Gaseous fuel injector 25 may be oriented at an angle relative to a central axis of cylinder bore 14, and a plane that is generally perpendicular to the central axis. Specifically, nozzle 42 may be tilted to inject downward toward piston 20 or upward toward cylinder head 18, for example by about +10°. Similarly, nozzle 42 may be offset to one side of the central axis so as to create swirl inside combustion chamber 22. This offset angle may be, for example, about ±100. In one embodiment, tip 44 may be have a generally round cross-section, with a diameter of about 16-24 mm. In another embodiment, tip 44 may have a generally rectangular cross-section, with a width of about 20-30 mm, and a height (aligned with the central axis of cylinder bore 14) of about 10-16 mm.

INDUSTRIAL APPLICABILITY

The disclosed engine system may be used in any machine or power system application where it is beneficial to reduce emissions of harmful gases, while also delivering inexpensive power output. The disclosed engine system finds particular applicability within mobile machines, such as locomotives, which can be subjected to large variations in load and emissions requirements. The disclosed engine system may provide an efficient way to deliver gaseous fuel known to produce lower levels of regulated exhaust constituents.

By injecting fuel at the disclosed timings, a greater amount of the gaseous fuel may be retained within combustion chamber 22. Specifically, the fuel injections may not start until after air inlet ports 24 are already closed by the upward motion of piston 20. And injector 25 may be positioned axially high enough to allow all of the required gaseous fuel to be injected before tip 44 of injector 25 is covered by piston 20. The axial location of injector 25 may still be low enough within cylinder liner 16 for sufficient mixing of the gaseous fuel prior to ignition.

Existing engines may be retrofitted to accept gaseous fuel injector 25. Specifically, any engine may be modified such that gaseous fuel can be radially injected into the engine's cylinders at a location associated with the timings described above. These modifications may include the drilling of bores 46 and 48 into engine block 12 and cylinder liner 16, respectively, and the machining of sealing faces around bores 46 and 48. Bore 46 may be larger than bore 48 and drilled first, with bore 48 being drilled by way of bore 46. The faces against which seals 54 are compressed may be machined before or after the formation of bores 46, 48. Thereafter, bore 48 may be tapped to form threads 56. Injector 25 (together with seals 54) may then be passed through bore 46 to thread into bore 48 and against the sealing faces. In some applications, this retrofitting of an existing engine with injector 25 may be accomplished without ever having to open combustion chamber 22 (e.g., by removing cylinder head 18) or removing cylinder liner 16 and piston 20. This may allow for a lower cost retrofit process and also result in less potential contamination of the engine. It should be noted that injector 25 may also be installed into an engine not having water jacket 38, if desired. In this application, seals 54 may be omitted.

It will be apparent to those skilled in the art that various modifications and variations can be made to the disclosed engine systems without departing from the scope of the disclosure. Other embodiments of the engine systems will be apparent to those skilled in the art from consideration of the specification and practice of the engine systems disclosed herein. It is intended that the specification and examples be considered as exemplary only, with a true scope of the disclosure being indicated by the following claims and their equivalents.

What is claimed is:

1. An engine system, comprising:
   an engine block at least partially defining a cylinder bore;
   a cylinder liner disposed within the cylinder bore;
   a fuel injector configured to pass radially through the cylinder bore and threadingly engage the cylinder liner;
   a cylinder head configured to close off an end of the cylinder bore;
   at least one intake air port formed within the cylinder liner; and
   a piston reciprocatingly disposed within the cylinder liner;
   wherein the fuel injector is configured to:
      threadingly engage the cylinder liner at a location between the cylinder head and the at least one intake air port and at an axial distance away from a center of the at least one intake air port that is approximately 1:5-10 of an internal diameter of the cylinder liner;
      begin injecting gaseous fuel when the at least one intake air port is closed off by piston approximately 100° before the piston reaches too-dead-center and to stop injecting fuel when the piston covers up a tip of the fuel injector approximately 120° before the piston reaches top-dead-center; and
   wherein the cylinder liner has an internal diameter of approximately 200-250 mm.

2. The engine system of claim 1, further including a water jacket located between the cylinder bore and the cylinder liner, wherein the fuel injector passes through the water jacket.

3. The engine system of claim 2, wherein the water jacket is formed between an internal wall of the cylinder bore and an external wall of the cylinder liner.

4. The engine system of claim 2, wherein the fuel injector includes:
   a base; and
   a nozzle connected at an end of the base and having a tip threaded to engage the cylinder liner.

5. The engine system of claim 4, wherein the fuel injector includes:
   a first shoulder located at a base of the nozzle, the first shoulder configured to abut the engine block; and
   a second shoulder located at a base of the tip, the second shoulder configured to abut the cylinder liner.

6. The engine system of claim 5, further including seals located at the first and second shoulders, wherein threaded engagement of the tip with the cylinder liner causes the first and second shoulders to compress the seals.

7. The engine system of claim 6, wherein:
   the engine block and the cylinder liner include machined faces, and bores that pass through the machined faces;
   the fuel injector is configured to be received by the bores; and
   the threaded engagement of the tip with the cylinder liner causes the first and second shoulders to compress the seals against the machined faces.

8. The engine system of claim 6, wherein the seals are elastomeric o-ring seals.

9. An engine system, comprising:
   an engine block at least partially defining a cylinder bore;
   a cylinder liner disposed within the cylinder bore;
   a water jacket located between the cylinder bore and the cylinder liner;
   a cylinder head configured to close off an end of the cylinder bore;
   at least one intake air port formed within the cylinder liner;
   a piston reciprocatingly disposed within the cylinder liner; and
   a fuel injector configured to pass radially through the water jacket and the cylinder bore to threadingly engage the cylinder liner at an axial location between the at least one intake air port and the cylinder head,
   wherein the fuel injector is configured to begin injecting fuel when the at least one intake air port is closed off by the piston approximately 100° before the piston reaches top-dead-center and to stop injecting fuel when the piston covers up a tip of the fuel injector approximately 120° before the piston reaches top-dead-center;
   wherein the fuel injector is configured to threadingly engage the cylinder liner an axial distance away from a center of the at least one intake air port that is approximately 1:5-10 of an internal diameter of the cylinder liner; and
   wherein the cylinder liner has an internal diameter of approximately 200-250 mm.

\* \* \* \* \*